(12) United States Patent
Roychoudhury et al.

(10) Patent No.: US 10,940,784 B1
(45) Date of Patent: Mar. 9, 2021

(54) CONFIGURABLE CUP HOLDER ASSEMBLY

(71) Applicant: Ford Global Technologies, LLC, Dearborn, MI (US)

(72) Inventors: Raj S. Roychoudhury, Bloomfield Hills, MI (US); Alan Seery, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/567,307

(22) Filed: Sep. 11, 2019

(51) Int. Cl.
*B60N 3/10* (2006.01)
*F16B 2/22* (2006.01)

(52) U.S. Cl.
CPC . *B60N 3/10* (2013.01); *F16B 2/22* (2013.01)

(58) Field of Classification Search
CPC .................................. B60N 3/10; F16B 2/22
USPC ...................... 248/346.04; 224/567; 220/737
See application file for complete search history.

(56) References Cited

U.S. PATENT DOCUMENTS

| | | | | |
|---|---|---|---|---|
| 3,707,272 | A * | 12/1972 | Rasmussen | B60N 3/103 248/311.2 |
| 5,897,090 | A * | 4/1999 | Smith | B01L 9/06 206/306 |
| 10,183,604 | B2 * | 1/2019 | Krishnan | B60N 3/103 |
| 2003/0029878 | A1 * | 2/2003 | Peitzmeier | B60N 2/06 220/737 |
| 2004/0021048 | A1 * | 2/2004 | Schaal | B60N 3/108 248/310 |
| 2011/0297717 | A1 | 12/2011 | Kaemmer | |
| 2013/0264339 | A1 | 10/2013 | Oldani et al. | |
| 2015/0251582 | A1 * | 9/2015 | Sawada | B60N 3/101 220/737 |
| 2016/0106245 | A1 * | 4/2016 | Sawada | B60N 3/10 220/737 |
| 2017/0274808 | A1 * | 9/2017 | Krishnan | B60N 3/10 |

* cited by examiner

*Primary Examiner* — Muhammad Ijaz
(74) *Attorney, Agent, or Firm* — David Coppiellie; Price Heneveld LLP

(57) ABSTRACT

A cup holder assembly is disclosed herein. The cup holder assembly includes a receptacle defining a cavity and having an engagement feature. A resilient finger is operably coupled to the receptacle and is operable between a disengaged position and an engaged position, wherein the resilient finger is engaged with the engagement feature. A resilient arm is coupled to the resilient finger and is operable to flex from a first position to a second position resilient finger inboard of the first position to allow the resilient finger to move between the disengaged and engaged positions.

17 Claims, 6 Drawing Sheets

CONFIGURABLE CUP HOLDER ASSEMBLY

FIELD OF THE INVENTION

The present invention generally relates to a configurable cup holder assembly. In particular, the present invention relates to a configurable cup holder assembly having one or more resilient fingers.

BACKGROUND OF THE INVENTION

Vehicle cup holders are often equipped with fingers-like features that are configured to stabilize a beverage container that is smaller than the receptacle of the cup holder. These finger-like features often protrude toward the center of the cup holder cavity and can impede vehicle occupants from cleaning the cup holder with ease. Finger-like features that may be easily removed from the cup holder may be desired.

SUMMARY OF THE INVENTION

According to a first aspect of the present invention, a cup holder assembly includes a receptacle defining a cavity and having an engagement feature. A resilient finger is operably coupled to the receptacle and is operable between a disengaged position and an engaged position, wherein the resilient finger is engaged with the engagement feature. A resilient arm is coupled to the resilient finger and is operable to flex from a first position to a second position that is resilient finger inboard of the first position to allow the resilient finger to move between the disengaged position and the engaged position.

Embodiments of the first aspect of the invention can include any one or a combination of the following features:
  a retention feature coupled to the resilient arm and configured to retain the resilient finger in the engaged position when the resilient arm is in the first position;
  an elongated body extending from a head portion to a tail portion and configured to protrude into the cavity of the receptacle;
  the elongated body bows outward from the receptacle into the cavity;
  the resilient arm comprises a plurality of resilient arms;
  a biasing member extending outward from the resilient finger and operable between an extended position and a compressed position, wherein movement of the resilient finger from the disengaged position to the engaged position biases the biasing member against the engagement feature to move the biasing member from the extended position to the compressed position; and
  a portion of the resilient arm protrudes into the cavity defined by the receptacle when the resilient finger is in the engaged position.

According to a second aspect of the present invention, a cup holder assembly includes a receptacle having a side wall extending upward from a base and defining a cavity. An engagement feature is coupled to the side wall. A resilient finger is configured to protrude into the cavity and has an elongated body extending from a tail portion to a head portion. The resilient finger is operable between a disengaged position and an engaged position, wherein the head portion is engaged with the engagement feature. The head portion includes a neck extending from the elongated body of the resilient finger, a resilient arm extending from the neck and operable to flex from a first position to a second position resilient finger inboard of the first position, a retention feature coupled to the resilient arm, and a biasing member extending outward from the neck. The biasing member is operable between an extended position and a compressed position, wherein the retention feature is configured to retain the head portion of the resilient finger in engagement with the engagement feature when the head portion is in the engaged position and the resilient arm is in the first position. Movement of the resilient arm from the first position to the second position allows the head portion to move between the engaged position and the disengaged position. Movement of the head portion from the disengaged position to the engaged position biases the biasing member against the engagement feature to move the biasing member from the extended positon to the compressed position.

Embodiments of the second aspect of the invention can include any one or a combination of the following features:
  the resilient arm comprises first and second resilient arms;
  the neck extends between a first end and a second end that is coupled to the elongated body, and the first and second resilient arms extend from the first end of the neck;
  the biasing member extends out of the first end of the neck from between the first and second resilient arms;
  the first and second resilient arms extend generally toward the second end of the neck;
  the neck is generally narrower than the elongated body;
  the retention feature extends from the resilient arm at an angle such that movement of the head portion from the disengaged position toward the engaged position causes the resilient arm to flex from the first position to the second position;
  the elongated body is curved to bow outward from the side wall of the receptacle into the cavity when the resilient finger is in the engaged position;
  the elongated body is configured to flex from an at rest position, where the elongated body extends into the cavity a first distance from the side wall, to a biased position, wherein the elongated body extends into the cavity a second distance from the side wall, wherein the first distance is greater than the second distance; and
  the tail portion is a first distance from the base of the receptacle when the elongated body is in the at rest position and a second distance from the base when the elongated body is in the biased position, wherein the first distance is greater than the second distance.

According to yet a third aspect of the present disclosure, a cup holder assembly includes a receptacle having an engagement feature. A resilient finger is operable between a disengaged position and an engaged position, wherein the resilient finger is engaged with the engagement feature. A resilient arm is coupled to the resilient finger and operable to flex from a first position to a second position to allow the resilient finger to move between the disengaged and engaged positions. A biasing member is coupled to the resilient finger and is configured to bias the resilient finger toward the disengaged position when the resilient finger is in the engaged position.

Embodiments of the third aspect of the invention can include any one or a combination of the following features:
  the biasing member is operable between an extended position and a compressed position, wherein movement of the resilient finger from the disengaged position to the engaged position biases the biasing member against the engagement feature to move the biasing member from the extended position to the compressed position; and a retention feature is coupled to the resilient arm and is configured to retain the resilient finger in the engaged position when the resilient arm is in the first position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
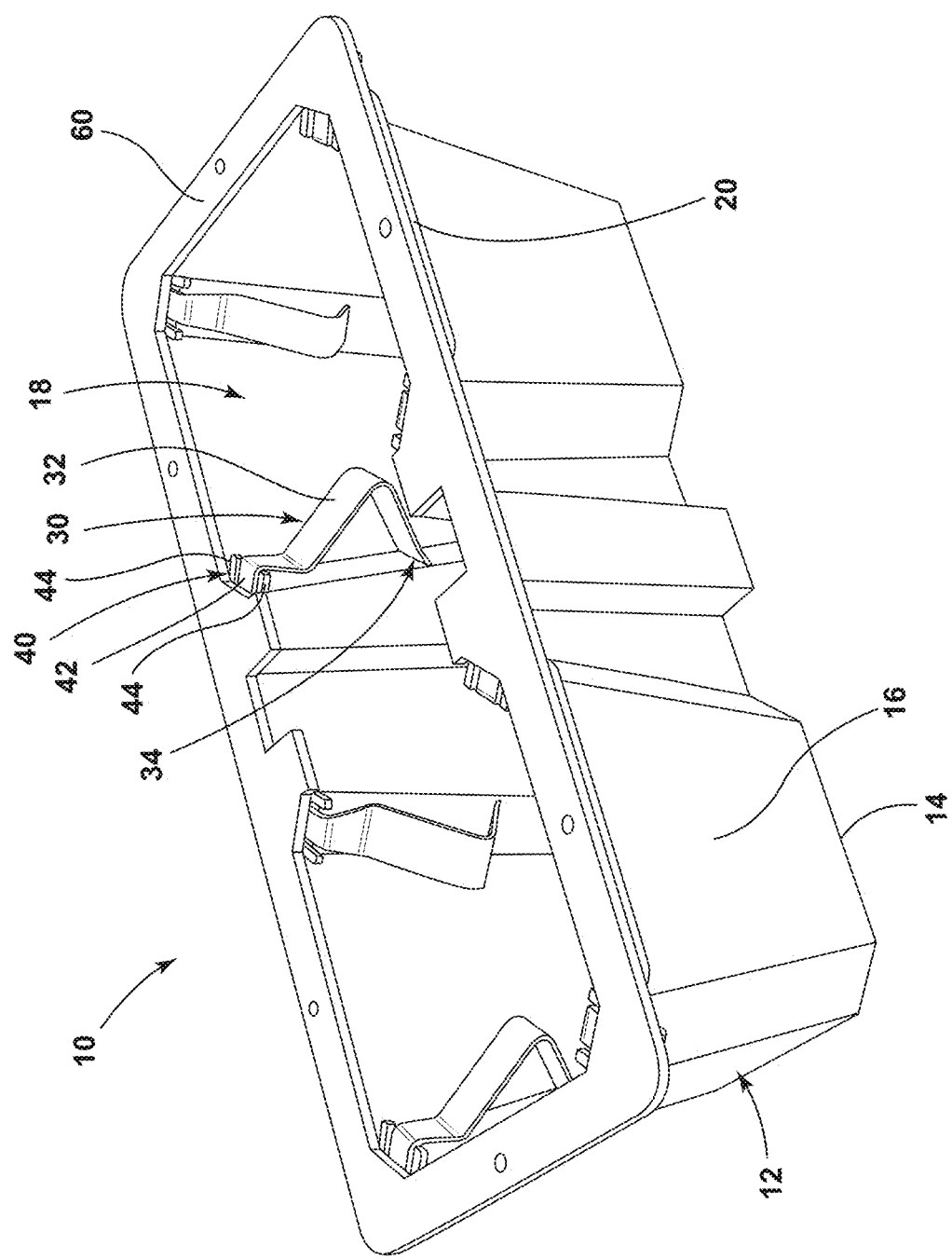
FIG. 1 is a perspective view of a cup holder assembly illustrating resilient fingers coupled to a receptacle, according to one embodiment.

In reference to FIGS. 1-6, a cup holder assembly 10 is disclosed herein. The cup holder assembly 10 may include a receptacle 12 defining a cavity 18 and having an engagement feature 22. A resilient finger 30 may be operably coupled to the receptacle 12 and may be operable between an engaged position, wherein the resilient finger 30 is engaged with the engagement feature 22 of the receptacle 12, and a disengaged position. As shown in FIG. 1, in various embodiments, the cup holder assembly 10 may include a plurality of resilient fingers 30, which may be resilient, generally elongated members configured to elastically yield when an object, such as a cup, is inserted into the receptacle 12, and apply pressure to the inserted object to hold it firmly within the receptacle 12. A resilient arm 44 may be coupled to the resilient finger 30 and may be operable to flex from a first position to a second position resilient finger inboard of the first position to allow the resilient finger 30 to move between the disengaged and engaged positions.

Figure 2:
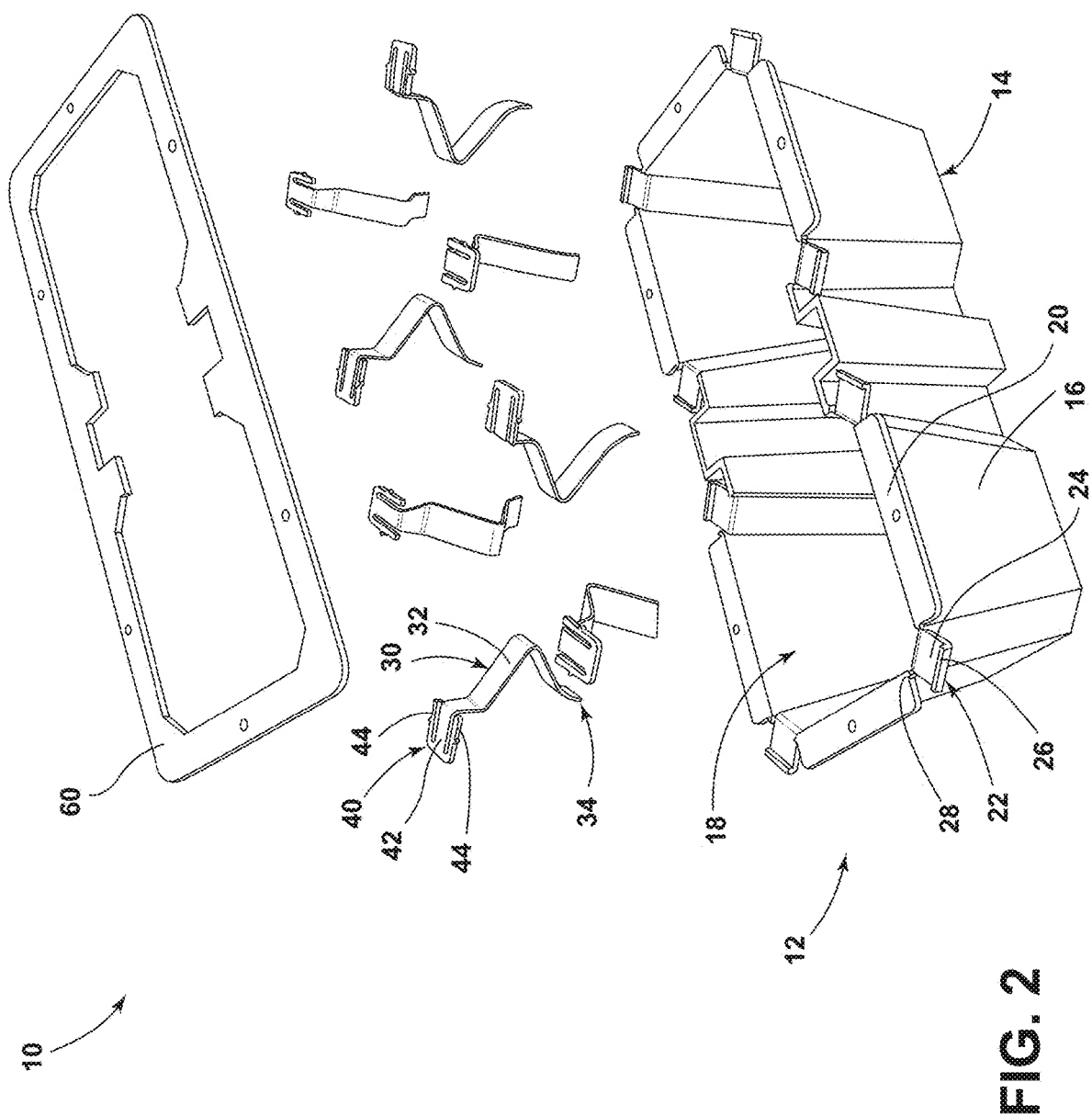
FIG. 2 is an exploded view of the cup holder assembly, illustrating the receptacle, the resilient fingers, and a cover feature, according to one embodiment.

Referring now to FIGS. 1 and 2, the cup holder assembly 10 may include the receptacle 12. The receptacle 12 may include a base 14. A side wall 16 may extend upward from the base 14. In various embodiments, the receptacle 12 may define the cavity 18. It is contemplated that there may be multiple side walls 16 and that the one or more side walls 16 may define various cavity 18 shapes (e.g., circular, square, rectangular, hexagonal, etc.).

In various embodiments, the side wall 16 may include an upper rim 20. The upper rim 20 may extend from the upper portion of the side wall 16. In some embodiments, the upper rim 20 may include an upward facing surface. The upward facing surface may be generally planar to the base 14 of the receptacle 12, in some embodiments. As shown in FIG. 2, the upper rim 20 may extend outward from the side wall 16. Further, the upper rim 20 may include one or more apertures or other features configured to attach other components of the cup holder assembly 10 thereto. For example, a cover feature 60 may be configured to attach to the upper rim 20 of the cup holder assembly 10 in some embodiments.

Referring further to FIGS. 1 and 2, in various embodiments, the cup holder assembly 10 may include the engagement feature 22. The engagement feature 22 may be configured to receive and/or retain the resilient finger 30. In various embodiments, the engagement feature 22 may be coupled to the side wall 16. In some embodiments, the engagement feature 22 may be proximate to the upper rim 20 of the receptacle 12. In various embodiments, a portion of the side wall 16 and/or the upper rim 20 may be included in the engagement feature 22. As shown in FIG. 2, the engagement feature 22 may extend outward from the side wall 16 and may be generally planar to the upper rim 20 and/or the base 14 of the receptacle 12.

In reference to the receptacle 12 depicted in FIG. 2, in some embodiments, the engagement feature 22 may include a shelf 24, a retaining lip 26, the side wall 16, the upper rim 20, and/or a combination thereof. The shelf 24 may be coupled to the side wall 16 of the receptacle 12. As shown in FIG. 2, the shelf 24 may extend outward from the side wall 16. In some embodiments, the shelf 24 may be generally, substantially, and/or majorly planar to the base 14 and/or the upper rim 20 of the receptacle 12. The retaining lip 26 may be coupled to the shelf 24. As shown in FIG. 2, the retaining lip 26 may extend upward from the shelf 24. In some embodiments, the retaining lip 26 may extend upward from the shelf 24 and then inward toward the side wall 16. As further illustrated in FIG. 2, the side wall 16 and/or the upper rim 20 may extend generally above the shelf 24 proximate to the portion of the shelf 24 that is coupled to the side wall 16. This portion of the side wall 16 and/or the upper rim 20 (illustrated in FIG. 2) may be included in the engagement feature 22 in various embodiments and may be referred to as a stop 28. In some embodiments, the stop 28 may be configured to engage with a retention feature 48 coupled to the resilient finger 30. The shelf 24, the retaining lip 26, and/or the stop 28 may be configured to support the resilient finger 30 and aid in retaining the resilient finger 30 in a desired position. It should be appreciated that, in various embodiments, the engagement feature 22 may include at least one of a variety of features configured to support and/or aid in retaining the resilient finger 30 in a desired position (e.g., aperture, port, slot, etc.). Further, it is contemplated that the engagement feature 22 may be coupled to various portions of the side wall 16 and need not be proximate to the upper rim 20 of the receptacle 12. For example, in some embodiments, the engagement feature 22 may be generally centered between the upper rim 20 and the base 14 of the receptacle 12.

In further reference to FIGS. 1 and 2, the cup holder assembly 10 is shown having four resilient fingers 30 for each cup-holding portion of the receptacle 12 (two cup-holding portions, and eight resilient fingers 30 are illustrated in total) positioned at 90° around the cup-holding portion of the receptacle 12. However, in various embodiments, the cup holder assembly 10 may include more or fewer resilient fingers 30 within the receptacle 12. In various embodiments, the resilient finger 30 may be coupled to the receptacle 12 and may be configured to yieldingly secure an object (e.g., a cup) within the cavity 18 of the receptacle 12. In some embodiments, the resilient finger 30 may be coupled to the side wall 16 of the receptacle 12 and may protrude into the cavity 18 defined by the receptacle 12. The resilient finger 30 may be curved to bow outward from the side wall 16 of the receptacle 12 into the cavity 18. In various embodiments, the resilient finger 30 may include an elongated body 32 that extends from a tail portion 34 to a head portion 40 of the resilient finger 30. In some embodiments, the elongated body 32 may be curved to bow outward from the side wall 16 of the receptacle 12 into the cavity 18, as shown in FIG. 1.

Figure 3A:
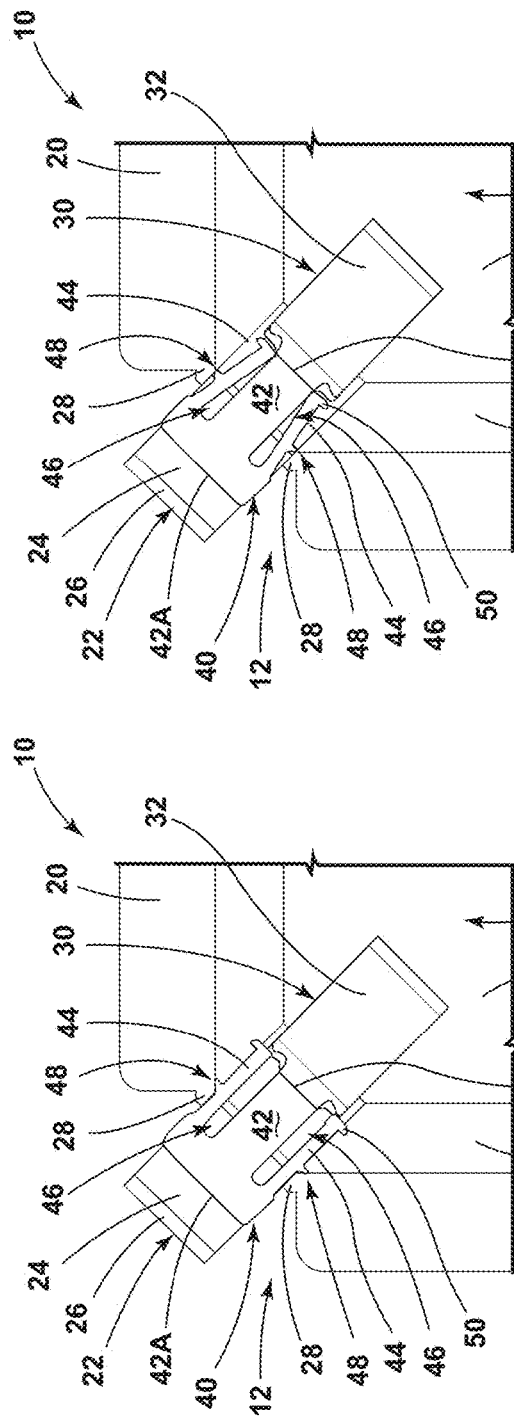
FIG. 3A is an elevational view of a portion of the cup holder assembly, illustrating the resilient finger in a disengaged position and a resilient arm in a first position, according to one embodiment.

Referring now to FIGS. 1-3A, in various embodiments, the head portion 40 may be coupled to the elongated body 32. In some embodiments, the head portion 40 may include a neck 42. The neck 42 may extend between a first end 42A and a second end 42B. The second end 42B may be coupled to the elongated body 32 and extend therefrom. In some embodiments, the neck 42 may be generally narrower than the elongated body 32 as shown in FIG. 3A. It is contemplated that the neck 42 may be the same width or even wider than the elongated body 32, in some embodiments.

Figure 3B:
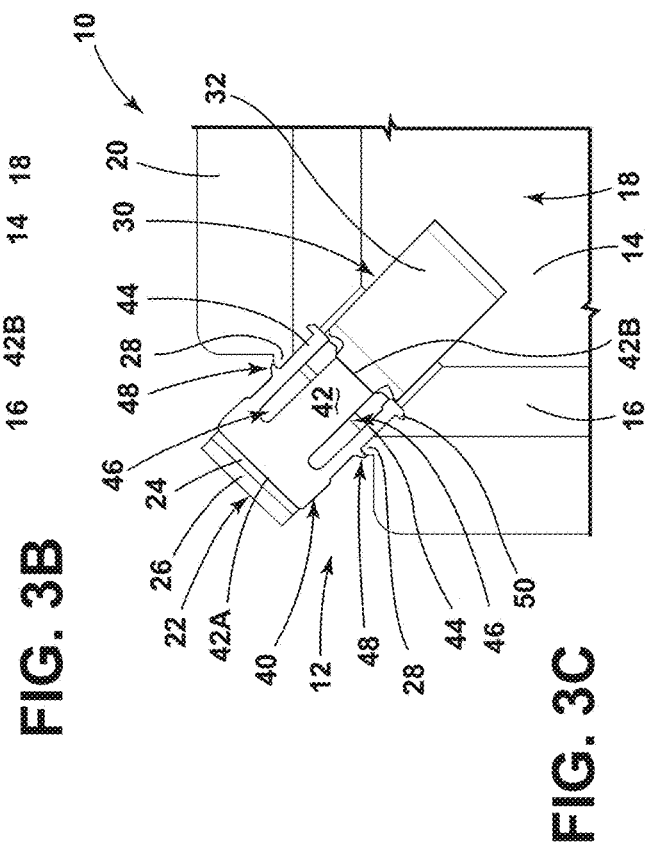
FIG. 3B is an elevational view of a portion of the cup holder assembly, illustrating the resilient finger in an engaged position and the resilient arm in a second position, according to one embodiment.
Figure 3C:
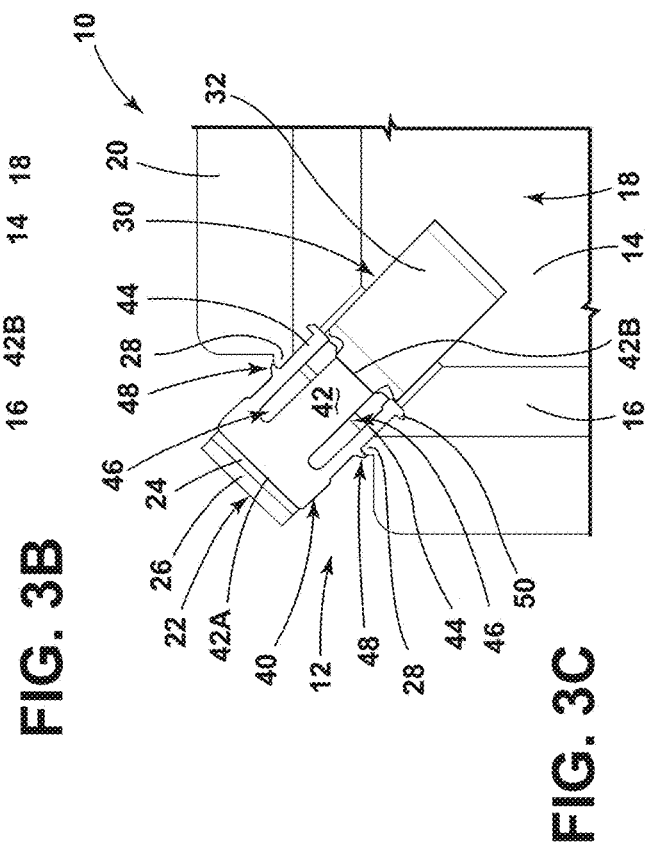
FIG. 3C is an elevational view of a portion of the cup holder assembly, illustrating the resilient finger in an engaged position and the resilient arm in the first position, according to one embodiment.

Referring now to FIGS. 3A-3C, in various embodiments, the resilient arm 44 may be coupled to the resilient finger 30. In some embodiments, the resilient arm 44 may be coupled to the head portion 40 of the resilient finger 30. As illustrated in FIGS. 3A-3C, in some embodiments, the resilient arm 44 may be coupled to the neck 42 of the head portion 40 of the resilient finger 30. Further, the resilient arm 44 may be coupled to the first end 42A of the neck 42. The resilient arm 44 may extend from the first end 42A of the neck 42 generally toward the second end 42B of the neck 42, as shown in FIG. 3A. In other words, the resilient arm 44 may extend away from the first end 42A of the neck 42 toward the elongated body 32 of the resilient finger 30. In various embodiments, the resilient arm 44 may be generally arcuate in shape, as shown in FIG. 3A where the resilient arm 44 extends outward from the first end 42A of the neck 42 and then generally curves and extends generally toward the second end 42B of the neck 42 and/or the elongated body 32. It is contemplated that, in various embodiments, the resilient arm 44 may be shapes other than arcuate.

Referring further to FIGS. 3A-3C, in various embodiments, the resilient finger 30 may include a recess 46. The recess 46 may be defined by the resilient arm 44 and the resilient finger 30. In some embodiments, the recess 46 may be defined by the resilient arm 44 and the head portion 40 of the resilient finger 30. Further, in some embodiment, the recess 46 may be defined by the resilient arm 44 and the neck 42. As shown in FIG. 3A, the recess 46 may be disposed between the portion of the neck 42 running from the first end 42A to the second end 42B and the resilient arm 44 generally extending from the first end 42A of the neck 42 toward the second end 42B of the neck 42.

In various embodiments, the resilient finger 30 may include the retention feature 48. In some embodiments, the retention feature 48 may be coupled to the head portion 40 of the resilient finger 30. Further, the retention feature 48 may be coupled to the resilient arm 44 of the resilient finger 30. As illustrated in FIGS. 3A-3C, the retention feature 48 may be coupled to the resilient arm 44 opposite the side of the resilient arm 44 that defines the recess 46. In some embodiments, the retention feature 48 may extend outward from the resilient arm 44 at an angle, as further shown in FIGS. 3A-3C. In particular, in some embodiments, the retention feature 48 may be disposed on the resilient arm 44 on the side opposite the side of the resilient arm 44 that defines the recess 46 and may extend outward therefrom at an angle (e.g., 30°, 45°, 60°, etc. relative to the resilient arm). In such embodiments, the retention feature 48 extends outward at an angle, such that the distance that the retention feature 48 protrudes from the resilient arm 44 increases as the retention feature 48 extends generally away from the portion of the resilient arm 44 that is coupled to the head portion 40 and/or the neck 42 of the resilient finger 30. As further illustrated in FIGS. 3A-3C, the inclined angle of the retention feature 48 may terminate after a span. In some embodiments, the side of the retention feature 48 most proximate to the elongated body 32 of the resilient finger 30 may be generally perpendicular to the surface of the adjoining resilient arm 44. It should be appreciated that, in various embodiments, the retention feature 48 may include one or more of a host of features configured to retain the resilient finger 30 in a desired position within the cup holder assembly 10.

Referring now to FIGS. 3A-3C, in various embodiments, the resilient finger 30 may include a tab feature 50. The tab feature 50 may be coupled to the resilient arm 44. In some embodiments, the tab feature 50 may be coupled to the end of the resilient arm 44 that is distal to the end of the resilient arm 44 that extends from the neck 42. The tab feature 50 may extend generally outward from the resilient arm 44 and may be configured to aid a user in manipulating the resilient arm 44 of the resilient finger 30. As illustrated in FIG. 3A, in some embodiments, the tab feature 50 may be angled and/or curved. The tab feature 50 being angled and/or curved in this way may have the effect that a force being applied to the tab feature 50 in a direction generally parallel to the length of the resilient arm 44 may influence the resilient arm 44 to flex generally resilient finger inboard toward the neck 42, as shown in FIG. 3B. It is contemplated that the tab feature 50 may be at least one of a variety of shapes in various embodiments. Further, it should be appreciated that, in various embodiments, the resilient finger 30 may include a plurality of resilient arms 44, tab features 50 and/or retention features 48. For example, as shown in FIG. 3A, the resilient finger 30 may include first and second resilient arms 44 extending outward from the first end 42A of the neck 42 and generally toward the second end 42B of the neck 42. As further illustrated in FIG. 3A, the resilient finger 30 may include corresponding tab features 50 and retention features 48 coupled to the first and second resilient arms 44.

Figure 4A:
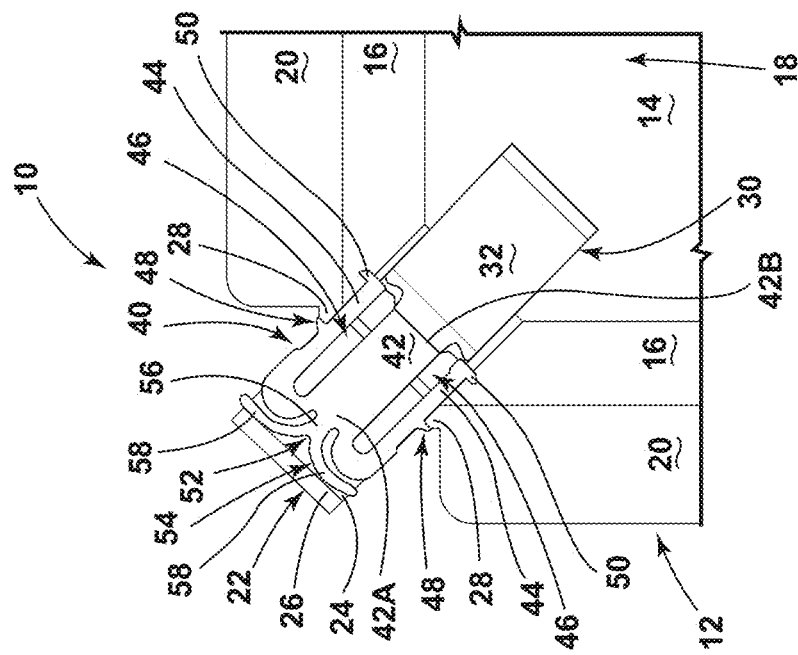
FIG. 4A is an elevational view of a portion of the cup holder assembly, illustrating the resilient finger in the disengaged position and a biasing member in an extended position, according to one embodiment.
Figure 4B:
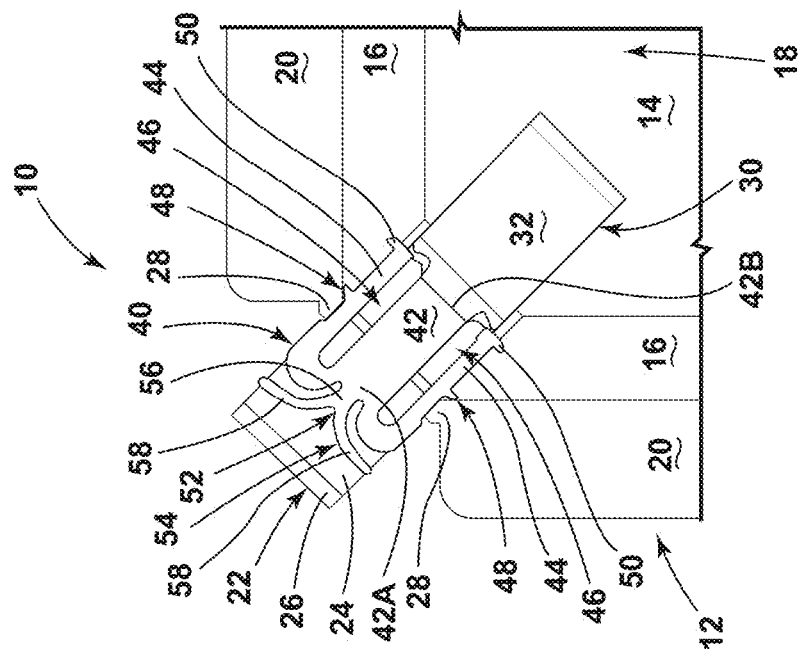
FIG. 4B is an elevational view of a portion of the cup holder assembly, illustrating the resilient finger in the engaged position and the biasing member in a compressed position, according to one embodiment.

Referring now to FIGS. 4A and 4B, in various embodiments, the resilient finger 30 may include a biasing member 52. The biasing member 52 may be coupled to the head portion 40 of the resilient finger 30. In some embodiments, the biasing member 52 may be coupled to the first end 42A of the neck 42 and may extend outward therefrom. As shown in FIGS. 4A and 4B, in some embodiments, where the resilient finger 30 includes first and second resilient arms 44, the biasing member 52 may extend out of the first end 42A of the neck 42 from between the first and second resilient arms 44. In various embodiments, the biasing member 52 may include one or more of a variety of features configured to bias the resilient finger 30 (e.g., spring, band, resilient V-shaped appendages, etc.). For example, as illustrated in FIGS. 4A and 4B, in some embodiments, the biasing member 52 may include a resilient wishbone feature 54. The resilient wishbone feature 54 may include a support base 56 coupled to the neck 42 and first and second legs 58 coupled to the support base 56 and extending outward therefrom. The first and second legs 58 may be configured to flex in response to a force being applied to the biasing member 52 in a direction generally running from the first end 42A of the neck 42 to the second end 42B of the neck 42, as shown in FIG. 4B.

Referring now to FIGS. 1 and 2, in various embodiments, the resilient finger 30 may include the tail portion 34. The tail portion 34 may generally be disposed proximate to the end of the resilient finger 30 distal to the head portion 40 of the resilient finger 30. In various embodiments, the tail portion 34 may be in contact with the side wall 16 of the receptacle 12 in operation of the cup holder assembly 10. In some embodiments, the tail portion 34 may be sliding contact with the side wall 16 of the receptacle 12. It is contemplated that, in some embodiments, the tail portion 34 may be coupled to the base 14 of the receptacle 12.

Figure 6:
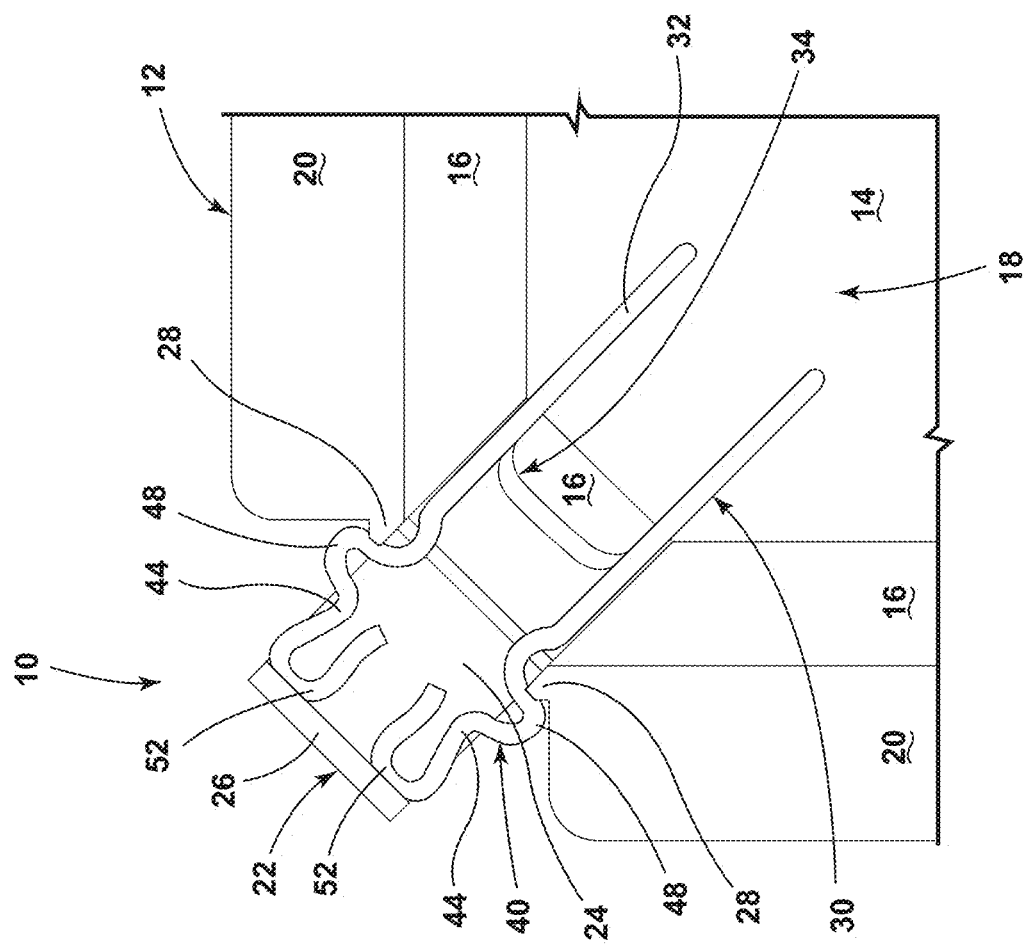
FIG. 6 is an elevational view of a portion of the cup holder assembly, illustrating a wire resilient finger, according to one embodiment.

It should be appreciated that, in various embodiments, the components of the resilient finger 30 may be integrally coupled with one another. For example, in some embodiments, the resilient finger 30 may be a single unitary plastic body that was integrally formed. In some embodiments, the resilient finger 30 may include a wire. Further, as shown in FIG. 6, in some embodiments, the resilient finger 30 may consist substantially, majorly, and/or entirely of the wire. In reference to FIGS. 1 and 2, in various embodiments, the cup holder assembly 10 may include a plurality of resilient fingers 30 for use in the receptacle 12, as illustrated.

Referring now to FIGS. 3A-3C, in various embodiments, the resilient finger 30 may be operable between the disengaged position and the engaged position. The resilient finger 30 may be engaged with the engagement feature 22 of the receptacle 12 when the resilient finger 30 is in the engaged position. In some embodiments, the head portion 40 of the resilient finger 30 may engage with the engagement feature 22. As such, in some embodiments, the head portion 40 may be operable between the disengaged and engaged positions. The head portion 40 of the resilient finger 30 may be engaged with the engagement feature 22 in a variety of ways, in various embodiments. For example, in some embodiments as illustrated in FIG. 3C, the shelf 24 may support an underside of the head portion 40 when the head portion 40 is engaged with the engagement feature 22. Further, when the head portion 40 is in the engaged position, the retaining lip 26 may act as a backstop for the portion of the head portion 40 that is proximate to the first end 42A of the neck 42. Further, as will be discussed subsequently, in some embodiments, the retaining lip 26 may act as a backstop for the biasing member 52 while the resilient finger 30 is in the engaged position. Additionally, in some embodiments, the retaining lip 26 may extend upward and then inward from the shelf 24 to provide a cover of sorts to at least a portion of the head portion 40 of the resilient finger 30, which may aid in holding the resilient finger 30 in the engaged position. In various embodiments, the retention feature 48 may engage with at least a portion of the engagement feature 22 to help retain the resilient finger 30 in the engaged position. For example, as shown in FIGS. 3C and 4B, the retention feature 48 may engage the stop 28 extending above the shelf 24 of the engagement feature 22 to help keep the engagement feature 22 from moving to the disengaged position. In some embodiments, a portion of the resilient arm 44 may protrude into the cavity 18 defined by the receptacle 12 when the resilient finger 30 is in the engaged position. The resilient finger 30 may be operable for use in the cup holder assembly 10 while in the engaged position. In various embodiments, the resilient finger 30 may be removed from the receptacle 12 by moving the resilient finger 30 from the engaged position to the disengaged position.

Referring now to FIGS. 3A and 3B, in various embodiments, the resilient arm 44 may be operable between a first position and a second position. The second position may be resilient finger inboard of the first position. In other words, the resilient arm 44 in the second position (FIG. 3B) may be closer to the neck 42 of the resilient finger 30 than the resilient arm 44 in the first position (FIG. 3A). In some embodiments, movement of the resilient arm 44 from the first position to the second position causes the resilient arm 44 to move into the recess 46 that is partially defined by the resilient arm 44 when the resilient arm 44 is in the first position. Consequently, the recess 46 may be smaller when the resilient arm 44 is in the second position relative to when the resilient arm 44 is in the first position. In various embodiments, the resilient arm 44 may be generally at rest while in the first position and may be configured to flex to the second position when a force is applied to the resilient arm 44. Further, the resilient arm 44 may be resilient, such that the resilient arm 44 may move back to the first position when the force applied to the resilient arm 44 is removed. In some embodiments, the resilient arm 44 may flex about the arcuate portions of the resilient arm 44.

Referring now to FIGS. 3A and 3B, in various embodiments, movement of the resilient arm 44 may allow movement of the resilient finger 30 between the disengaged and engaged positions. In some embodiments, this freedom of movement of the resilient finger 30 between the engaged position and the disengaged position is enabled by disengagement of the retention feature 48 from the engagement feature 22 as a result of the resilient arm 44 moving from the first position to the second position. As shown in FIG. 3C, in some embodiments, the retention feature 48 is configured to engage with the stop 28 of the engagement feature 22 when the resilient arm 44 is in the first position. Movement of the resilient arm 44 from the first position to the second position may cause the adjoining retention feature 48 to move resilient finger inboard, which may result in the retention feature 48 no longer engaging the stop 28 of the engagement feature 22. As such, when the resilient arm 44 is in the second position, the resilient finger 30 may be generally free to move between the engaged position and the disengaged position, in some embodiments. In some embodiments, a user may manually move the resilient arm 44 from the first position to the second position to allow the resilient finger 30 to move from the disengaged positon to the engaged position. The user may then move the resilient finger 30 from the disengaged position to the engaged position. Next, the user may release the resilient arm 44, such that the resilient arm 44 moves back from the second position to the first position, which may enable the retention feature 48 coupled to the resilient arm 44 to engage the stop 28 of the engagement feature 22. Thus, the resilient finger 30 may be moved from the disengaged position to the engaged position and secured therein.

In some embodiments, wherein the retention feature 48 is coupled to the resilient arm 44 and is angled outward therefrom, a user may move the resilient finger 30 from the disengaged position to the engaged position without manually manipulating the resilient arm 44. In such an embodiment, movement of the resilient finger 30 from the disengaged position to the engaged position may cause the retention feature 48 to contact a portion of the receptacle 12 (e.g., side wall 16, stop 28, etc.), and the force applied to the angled retention feature 48 by the portion of the receptacle 12 may cause the resilient arm 44 to flex from the first position to the second position until the retention feature 48 bypasses the portion of the receptacle 12. When the angled portion of the retention feature 48 passes the stop 28 of the engagement feature 22 as the resilient finger 30 moves from the disengaged position to the engaged position, the resilient arm 44 may rebound back to the first position, which may engage the retention feature 48 with the stop 28 of the engagement feature 22, as shown in FIG. 3C, to securely engage the resilient finger 30 with the engagement feature 22.

Referring now to FIGS. 4A and 4B, in various embodiments, the biasing member 52 may be operable to be biased from an extended position to a compressed position. As illustrated in FIG. 4B, movement of the head portion 40 of the resilient finger 30 from the disengaged position to the engaged positon may bias the biasing member 52 against the engagement feature 22 to move the biasing member 52 from the extended position to the compressed position. For example, in some embodiments, movement of the head portion 40 of the resilient finger 30 from the disengaged position to the engaged position may cause the first and second legs 58 of the resilient wishbone feature 54 to contact and bow against the retaining lip 26 of the engagement feature 22, as shown in FIG. 4B. This compression of the biasing member 52 may cause the retention feature 48 to be in pressured contact with the stop 28 of the engagement feature 22 which may result in a more secure engagement of the resilient finger 30 in the engagement feature 22, and may reduce rattling of the resilient finger 30 within the receptacle 12. Additionally, when the resilient arm 44 is moved from the first to second positon to allow the resilient finger 30 to move from the engaged position to the disengaged position, the biasing member 52 may forcibly move back to the extended position, where the biasing member 52 is generally at rest. This may propel the resilient finger 30 toward the disengaged position, which may enable convenient removal of the resilient finger 30 from the receptacle 12.

Figure 5A:
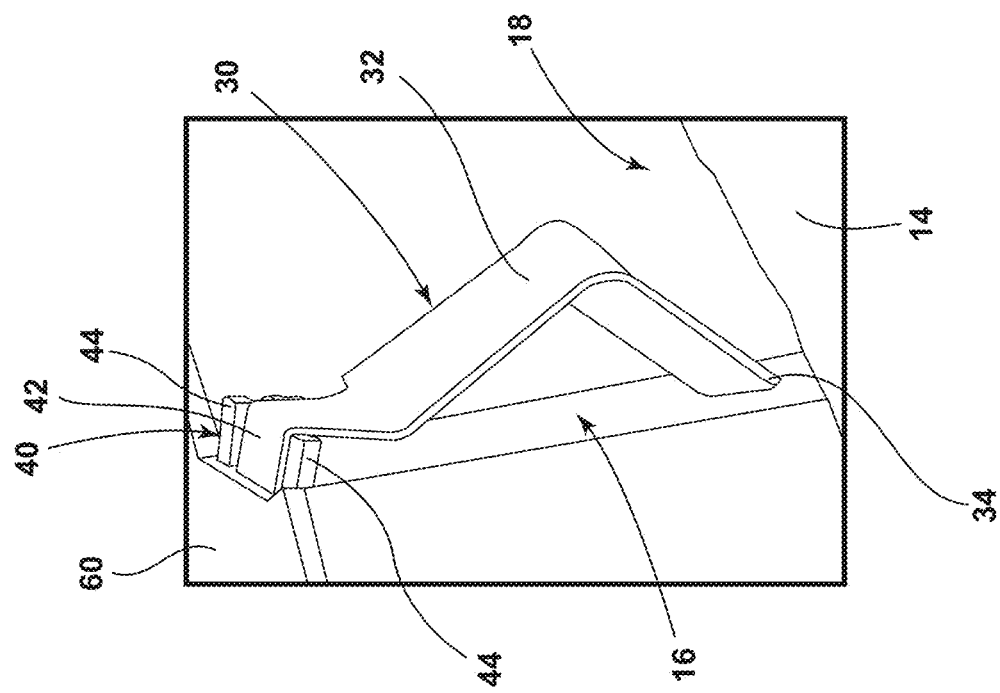
FIG. 5A is a side perspective view of the resilient finger engaged with the receptacle, illustrating the resilient finger in an at rest position, according to one embodiment.
Figure 5B:
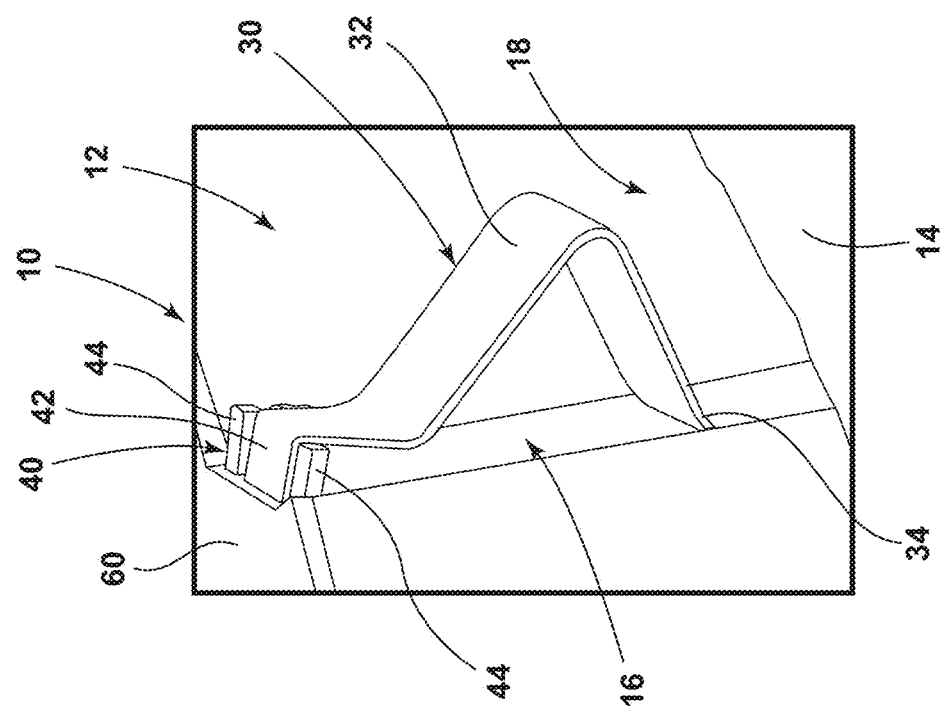
FIG. 5B is a side perspective view of the resilient finger engaged with the receptacle, illustrating the resilient finger in a biased position, according to one embodiment.

Referring now to FIGS. 5A and 5B, in various embodiments, the elongated body 32 of the resilient finger 30 may be curved to bow outward from the side wall 16 of the receptacle 12 into the cavity 18 when the resilient finger 30 is in the engaged position. The elongated body 32 may be configured to flex from an at rest position, where the elongated body 32 extends into the cavity 18 a first distance from the side wall 16, to a biased position, where the elongated body 32 extends into the cavity 18 of the receptacle 12 a second distance from the side wall 16. In various embodiments, the first distance may be greater than the second distance, as depicted in FIGS. 5A and 5B. Further, in various embodiments, the tail portion 34 of the resilient finger 30 may be a first distance from the base 14 of the receptacle 12 when the elongated body 32 of the resilient finger 30 is in the at rest position, and a second distance from the base 14 of the receptacle 12 when the elongated body 32 is in the biased position. In various embodiments, the first distance may be greater than the second distance, as shown in FIGS. 5A and 5B. The resilient finger 30 may move from the at rest position to the biased position in response to a force being applied to the portion of the elongated body 32 facing generally cavity inward. For example, a cup being thrust into the cavity 18 of the receptacle 12 and contacting the resilient finger 30 may cause the resilient finger 30 to yield from the at rest position to the biased position.

In reference to FIGS. 1 and 2, in some embodiments, the cup holder assembly 10 may include the cover feature 60. The cover feature 60 may be configured to cover the upper rim 20 of the receptacle 12. In some embodiments, the cover feature 60 may be configured to cover the engagement feature 22 and/or the portion of the resilient finger 30 disposed within the engagement feature 22, as shown in FIG. 1. In some embodiments, the cover feature 60 may be configured to aid in securing the resilient finger 30 in the engaged position. However, it is contemplated that, in various embodiments, the cover feature 60 may be decorative. Further, it should be appreciated that, in various embodiments, the cup holder assembly 10 may not include the cover feature 60.

In operation, a user may insert a beverage container into the receptacle 12 of the cup holder assembly 10. One or more resilient fingers 30 may yield to allow the beverage container to enter the receptacle 12, and may apply pressure to one or more sides of the beverage container to hold it firmly within the cavity 18 of the receptacle 12. The user may then remove the beverage container from the receptacle 12 and, upon desiring to clean the base 14 and side walls 16 of the receptacle 12 thoroughly, may remove the one or more resilient fingers 30 from the receptacle 12 to allow for convenient access. In removing the one or more resilient fingers 30 from the receptacle 12, the user may move the resilient arm 44 coupled to the head portion 40 of the resilient finger 30 from the first position to the second position, which may disengage the retention feature 48 from the stop 28 of the engagement feature 22. Disengagement of the retention feature 48 from the stop 28 of the engagement feature 22 may enable the biasing member 52 coupled to the head portion 40 of the resilient finger 30 to resiliently decompress from the compressed position, wherein the biasing member 52 is in pressured contact with the retaining lip 26 of the engagement feature 22, to the extended position. This decompression of the biasing member 52 may propel the resilient finger 30 from the engaged position to the disengaged position, to allow for convenient removal of the resilient finger 30 from the engagement feature 22 and receptacle 12.

The present disclosure may provide a variety of advantages. First, the resilient finger 30 coupled to the receptacle 12 may aid in securely retaining a beverage container within the cavity 18 of the receptacle 12. Second, the ability to move the resilient finger 30 from the engaged position to the disengaged position may enable more convenient removal of the resilient finger 30 from the receptacle 12. Third, convenient removal of the resilient finger 30 from the receptacle 12 may allow for easy cleaning of various components of the cup holder assembly 10. Fourth, convenient removal of the resilient finger 30 from the receptacle 12 may allow a user to conveniently configure the cup holder assembly 10, such that the cup holder assembly 10 resembles a bin for storing various items.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cup holder assembly, comprising:
a receptacle defining a cavity and having an engagement feature; and
a resilient finger operably coupled to the receptacle, configured to protrude into the cavity, and having an elongated body extending from a tail portion to a head portion that is operable between a disengaged position and an engaged position, wherein the head portion is engaged with the engagement feature, the head portion comprising:
a neck extending from the elongated body of the resilient finger; and
first and second resilient arms extending outward from the neck and operable to flex toward each other from first positions to second positions to allow the head portion to move between the disengaged and engaged positions.

2. The cup holder assembly of claim 1, further comprising:
a retention feature coupled to the first resilient arm and configured to retain the head portion in the engaged position when the first resilient arm is in the first position.

3. The cup holder assembly of claim 1, wherein the elongated body bows outward from the receptacle into the cavity.

4. The cup holder assembly of claim 1, further comprising:
a biasing member extending outward from the head portion and operable between an extended position and a compressed position, wherein movement of the head portion from the disengaged position to the engaged position biases the biasing member against the engagement feature to move the biasing member from the extended position to the compressed position.

5. A cup holder assembly, comprising:
a receptacle having a side wall extending upward from a base and defining a cavity;
an engagement feature coupled to the side wall;
a resilient finger configured to protrude into the cavity and having an elongated body extending from a tail portion to a head portion that is operable between a disengaged position and an engaged position, wherein the head portion is engaged with the engagement feature, the head portion comprising:
a neck extending from the elongated body of the resilient finger;
a resilient arm extending from the neck and operable to flex from a first position to a second position inboard of the first position;
a retention feature coupled to the resilient arm; and
a biasing member extending outward from the neck and operable between an extended position and a compressed position, wherein the retention feature is configured to retain the head portion of the resilient finger in engagement with the engagement feature when the head portion is in the engaged position and the resilient arm is in the first position, movement of the resilient arm from the first position to the second position allows the head portion to move between the engaged position and the disengaged position, and movement of the head portion from the disengaged position to the engaged position biases the biasing member against the engagement feature to move the biasing member from the extended position to the compressed position.

6. The cup holder assembly of claim 5, wherein the resilient arm comprises:
first and second resilient arms.

7. The cup holder assembly of claim 6, wherein the neck extends between a first end and a second end that is coupled to the elongated body, and the first and second resilient arms extend from the first end of the neck.

8. The cup holder assembly of claim 7, wherein the biasing member extends out of the first end of the neck from between the first and second resilient arms.

9. The cup holder assembly of claim 7, wherein the first and second resilient arms extend generally toward the second end of the neck.

10. The cup holder assembly of claim 5, wherein the neck is generally narrower than the elongated body.

11. The cup holder assembly of claim 5, wherein the retention feature extends from the resilient arm at an angle such that movement of the head portion from the disengaged position toward the engaged position causes the resilient arm to flex from the first position to the second position.

12. The cup holder assembly of claim 5, wherein the elongated body is curved to bow outward from the side wall of the receptacle into the cavity when the resilient finger is in the engaged position.

13. The cup holder assembly of claim 12, wherein the elongated body is configured to flex from an at rest position, where the elongated body extends into the cavity a first distance from the side wall, to a biased position, where the elongated body extends into the cavity a second distance from the side wall, wherein the first distance is greater than the second distance.

14. The cup holder assembly of claim 13, wherein the tail portion is a first distance from the base of the receptacle when the elongated body is in the at rest position and a second distance from the base when the elongated body is in the biased position, wherein the first distance is greater than the second distance.

15. A cup holder assembly, comprising:
a receptacle defining a cavity and having an engagement feature;
a resilient finger extending from a tail portion that protrudes into the cavity to a head portion that is operable between a disengaged position and an engaged position, wherein the head portion is engaged with the engagement feature;
a resilient arm coupled to the head portion and operable to flex from a first position to a second position to allow the head portion to move between the disengaged and engaged positions; and
a biasing member coupled to the head portion and configured to bias the head portion toward the disengaged position when the head portion is in the engaged position.

16. The cup holder assembly of claim 15, wherein the biasing member is operable between an extended position and a compressed position, wherein movement of the head portion from the disengaged position to the engaged position biases the biasing member against the engagement feature to move the biasing member from the extended position to the compressed position.

17. The cup holder assembly of claim 16, further comprising:
a retention feature coupled to the resilient arm and configured to retain the head portion in the engaged position when the resilient arm is in the first position.

* * * * *